(12) United States Patent
Kobayashi et al.

(10) Patent No.: US 8,000,012 B2
(45) Date of Patent: Aug. 16, 2011

(54) OPTICAL MULTILAYER FILM AND IMAGE DISPLAY DEVICE

(75) Inventors: Takashi Kobayashi, Fujinomiya (JP); Katsuyoshi Suzuki, Fujinomiya (JP)

(73) Assignee: Fujifilm Corporation, Tokyo (JP)

( * ) Notice: Subject to any disclaimer, the term of this patent is extended or adjusted under 35 U.S.C. 154(b) by 570 days.

(21) Appl. No.: 12/022,640

(22) Filed: Jan. 30, 2008

(65) Prior Publication Data
US 2008/0180801 A1  Jul. 31, 2008

(30) Foreign Application Priority Data

Jan. 31, 2007 (JP) ................................. 2007-021635
Mar. 6, 2007 (JP) ................................. 2007-055546

(51) Int. Cl.
*G02B 1/10* (2006.01)

(52) U.S. Cl. .......................... 359/586; 359/582; 359/588

(58) Field of Classification Search .................. 359/586, 359/582, 588; 428/331, 332; 349/98; 523/111
See application file for complete search history.

(56) References Cited

U.S. PATENT DOCUMENTS 6,842,288 B1 * 1/2005 Liu et al. ........................ 359/586
6,864,932 B2 * 3/2005 Miyatake et al. ................ 349/98
7,332,216 B2 * 2/2008 Hashimoto et al. ............. 428/331
7,390,099 B2 * 6/2008 Takao et al. ..................... 359/601
7,604,866 B2 * 10/2009 Ohashi et al. ................... 428/446
2006/0142412 A1 * 6/2006 Yamaoka et al. ............. 523/111

FOREIGN PATENT DOCUMENTS

| JP | 2000-111706 A | 4/2000 |
| JP | 2001-294826 A | 10/2001 |
| JP | 2003-177209 A | 6/2003 |
| JP | 2004-54161 A | 2/2004 |
| JP | 2005-97571 A | 4/2005 |
| JP | 2005-178173 A | 7/2005 |

* cited by examiner

*Primary Examiner* — Audrey Y Chang
(74) *Attorney, Agent, or Firm* — Sughrue Mion, PLLC (57) ABSTRACT

A first adhesion layer and a second adhesion layer are formed on a base material formed of polyester biaxially stretched in this order from the side of the base material. Additionally, a hard coat layer and an antireflection layer are formed on the second adhesion layer to form a multilayer film. When refractive indices of the base material, the first adhesion layer, the second adhesion layer, and the hard coat layer are $\eta 1$, $\eta 2$, $\eta 3$, and $\eta 4$, respectively, the refractive indices are adjusted so as to satisfy the following formulae (1) to (3) to prevent rainbow unevenness.

$$(\eta 1/\eta 4)^{1/2} \times 0.95 \leq \eta 2/\eta 3 \leq (\eta 1/\eta 4)^{1/2} \times 1.05 \quad (1)$$

$$\eta 1 < \eta 4 \quad (2)$$

$$\eta 2 < \eta 3 \quad (3)$$

The two adhesion layers can enhance the adhesive strength with the base material.

10 Claims, 1 Drawing Sheet

OPTICAL MULTILAYER FILM AND IMAGE DISPLAY DEVICE

FIELD OF THE INVENTION

The present invention relates to an optical multilayer film, and an image display device such as a liquid crystal display (LCD), a plasma display (PDP), an organic electroluminescence display (organic EL display), surface-conduction electron-emitter display (SED), and a cathode ray tube display (CRT display) using the optical multilayer film as a component of the image display device.

BACKGROUND OF THE INVENTION

In accordance with an increase in demand for an image display device such as a LCD, a PDP, an organic EL display, a SED, and a CRT display, demand for an optical film as a main component of the image display device has been rapidly increasing for the purpose of obtaining high-quality image thereof. The optical film is a film provided with various optical functions for achieving prevention of reflection of external light, enlargement of viewing angle, correction of optical unevenness, and the like.

The optical film is generally a multilayer film having a multilayer structure composed of a base material as a base, and an upper layer deposited thereon. The base material is typically a transparent film including a polymer as its main component. Among the base materials, the demand for a base material formed of polyester has been increasing, because the base material has features such as excellence in transparency, dimensional stability, chemical resistance, low hygroscopicity, and the like. The upper layer includes a polymer as its main component and additives for providing various optical functions for preventing of reflection of light on the optical multilayer film and the like. As the upper layer there are an antireflection layer, a prism layer, a light scattering layer, and the like, for example. By arbitrarily deciding combination between the base material and the upper layer, it is possible to readily form various optical films such as a prism film, an antireflection film, and a light scattering film for use in the LCD, and further an infrared ray (IR) absorption film, an electromagnetic wave shielding film, a toning film, an antireflection film, an antiglare film, a hard coat film, and the like for use in the PDP, for example.

However, in a case where adhesive strength between the base material and the upper layer is low, the upper layer may be peeled from the base material, thus causing light leakage and making it impossible to prevent light from reflecting. Therefore, the adhesive strength is important in the optical multilayer film, however, it is difficult to enhance the adhesive strength up to a predetermined level since the adhesive strength tends to be easily affected by material composition of the base material and the upper layer, irregularities on the contact surface, formation condition of each layer, and the like. In view of the above, for example, in Japanese Patent Laid-Open Publication No. 2001-294826, there is disclosed an optical multilayer film in which the base material contains polyester, and an adhesion layer including polyester formed thereon, thus enhancing the adhesive strength.

Moreover, since the optical multilayer film is composed of a plurality of materials, whose refractive indices are different from each other, such as the base material, the adhesion layer, and the upper layer, light is easily reflected on the interfaces therebetween. Further, when light is reflected on the interfaces, the reflected light interfere with each other to cause a phenomenon in which rainbow color is appeared (rainbow unevenness). Accordingly, displaying quality in using the optical multilayer film drastically deteriorates. At present, a refractive index of a typical base material formed of polyester is approximately 1.65 that is relatively high. Accordingly, there is proposed a method in which the refractive index of a layer next to the base material is increased so as to decrease the difference in refractive indices between the base material and the layer next to the base material. For example, in Japanese Patent Laid-Open Publication No. 2004-054161, there is disclosed a multilayer film including an adhesion layer containing fine particles as a predetermined metal oxide so as to have higher refractive index. In Japanese Patent Laid-Open Publication No. 2005-097571, there is disclosed a multilayer film including a layer in which coating liquid containing a water-soluble titanium chelate compound, aqueous polyester, and water is applied to a base material formed of polyester, and a hard coat layer. Furthermore, in Japanese Patent Laid-Open Publication No. 2000-111706, there is disclosed a multilayer film including a base material, an adhesion layer and an upper layer in which the differences in refractive index between the base material and the adhesion layer and between the base material the upper layer are adjusted by focusing on refractive index of polymer and arbitrarily making a decision.

The rainbow unevenness also occurs by thickness unevenness of each layer. In particular, in a case where thickness unevenness occurs on the upper layer, the reflected light becomes more intense at a certain thickness, and rainbow unevenness is more apparent on the multilayer film, thus causing a problem. In view of the above, in Japanese Patent Laid-Open Publication No. 2003-177209, for example, there is disclosed a method in which a film is produced while adjusting a refractive index of the adhesion layer and the film thickness thereof so as to prevent occurrence of rainbow unevenness. Further, in Japanese Patent Laid-Open Publication No. 2005-178173, there is disclosed a multilayer film including a primer layer having higher refractive index by adding inorganic fine particles having titanium dioxide as its main component to at least one of surfaces of a transparent base material.

In any case describe above, for the purpose of preventing rainbow unevenness, fine particles, a chelate compound, or the like is added to the adhesion layer. However, in this case, the fine particles, the chelate compound, or the like precipitates between the base material and the adhesion layer, and between the adhesion layer and the upper layer, and then the adhesive strength therebetween decreases, thus causing a problem. Furthermore, when a large amount of fine particles are added for the purpose of increasing the refractive index, strength of each of the layers decreases, thus consequently causing decrease in strength of the film as a whole. Additionally, in Japanese Patent Laid-Open Publication No. 2003-177209, there is disclosed a method in which polymer having a desired refractive index is arbitrarily selected to be used and thereby a refractive index of an adhesion layer is adjusted. However, such a polymer is expensive mostly, and therefore manufacturing cost increases, thus causing a problem.

SUMMARY OF THE INVENTION

In view of the above, a first object of the present invention is to provide a multilayer film capable of preventing occurrence of rainbow unevenness and having various excellent optical properties such as antireflection properties. Further, a second object of the present invention is to provide an image display device capable of achieving excellent displaying quality with use of the optical multilayer film described above.

To achieve the above and other objects, according to the present invention, there is provided an optical multilayer film including: a base material formed of polyester having a refractive index of $\eta 1$; a first adhesion layer having a refractive index of $\eta 2$ on the base material; a second adhesion layer having a refractive index of $\eta 3$ on the first adhesion layer; and a surface layer having a refractive index of $\eta 4$ on the second adhesion layer. The $\eta 1$, $\eta 2$, $\eta 3$ and $\eta 4$ satisfy a formula (1).

$$(\eta 1/\eta 4)^{1/2} \times 0.95 \leq \eta 2/\eta 3 \leq (\eta 1/\eta 4)^{1/2} \times 1.05 \quad (1)$$

Preferably, the surface layer is a hard coat layer, and the refractive indices $\eta 1$, $\eta 2$, $\eta 3$, and $\eta 4$ of the base material, first adhesion layer, second adhesion layer, and surface layer satisfy formulae (2) and (3).

$$\eta 1 < \eta 4 \quad (2)$$

$$\eta 2 < \eta 3 \quad (3)$$

Further, the first adhesion layer and the second adhesion layer preferably include at least one of polyester, polyurethane, and acrylic resin. Further, the second adhesion layer preferably includes fine particles containing one of tin oxide, indium oxide, zirconium oxide, and titanium oxide as its main component. Preferably, the first adhesion layer and/or the second adhesion layer include/includes a compound containing a plurality of carbodiimide structures in its molecule.

Moreover, according to the present invention, it is preferable that d1 (nm) as a thickness of the first adhesion layer and the $\eta 2$ satisfy a formula (4), and d2 (nm) as a thickness of the second adhesion layer and the $\eta 3$ satisfy a formula (5), at a wavelength $\lambda$ of visible light in a range of 550 nm to 600 nm.

$$-30 \leq d1 - \{\lambda/(4 \times \eta 2)\} \leq 30 \quad (4)$$

$$-30 \leq d2 - \{\lambda/(4 \times \eta 3)\} \leq 30 \quad (5)$$

Further, preferably, the polyester is polyethylene terephthalate, and $\eta 4$ as the refractive index of the hard coat layer is in a range of 1.75 to 2.0. It is preferable that an antireflection layer is formed on the hard coat layer and the antireflection layer has a refractive index of 1.50 or less.

According to the present invention, preferably, the surface layer is a near infrared ray absorption (NIRA) coat layer, and the first adhesion layer and the second adhesion layer include at least one of polyester, polyurethane, and acrylic resin. Further, it is preferable that d1 (nm) as a thickness of the first adhesion layer and the $\eta 2$ satisfy a formula (4), and d2 (nm) as a thickness of the second adhesion layer and the $\eta 3$ satisfy a formula (5), at a wavelength $\lambda$ of visible light in a range of 550 nm to 600 nm.

$$-30 \leq d1 - \{\lambda/(4 \times \eta 2)\} \leq 30 \quad (4)$$

$$-30 \leq d2 - \{\lambda/(4 \times \eta 3)\} \leq 30 \quad (5)$$

Further, the multilayer film of the present invention preferably includes an adhesion layer having a single-layer structure or a multilayer structure formed on the base material, and the hard coat layer formed on the adhesion layer.

Moreover, an image display device of the present invention is characterized by including an optical multilayer film described above.

According to the present invention, the first adhesion layer, the second adhesion layer, and the surface layer are stacked on the base material formed of polyester in this order from a side of the base material, thus constituting a multilayer structure. Thereby, it is possible to obtain the optical multilayer film in which the adhesion strength is kept at a high level between the layers, and the occurrence of rainbow unevenness is prevented. Moreover, the image display device capable of achieving excellent displaying quality can be obtained with use of the optical multilayer film as the component thereof.

Note that in order to reduce the degree of reflection of light on the antireflection film, it is recent trend that the refractive index of the hard coat layer is increased. In a case where the refractive index of the hard coat layer is increased, it is necessary to increase the refractive index of the adhesion layer for the purpose of preventing the rainbow unevenness (in this case the adhesion layer has a single-layered structure). In this case, the rate of content of metal oxide particles in the adhesion layer becomes high in order to increase the refractive index of the adhesion layer, and accordingly the strength of the adhesion layer decreases. According to the present invention, since the adhesion layer includes two layers, it is possible to prevent rainbow unevenness without increasing the refractive index of each of the adhesion layers. Thereby, the optical multilayer film capable of keeping the adhesive strength between the layers at a desired level and suppressing occurrence of the rainbow unevenness.

Moreover, according to the present invention, the first adhesion layer, the second adhesion layer, and the NIRA coat layer as the surface layer are stacked on the base material in this order from the side of the base material, thus constituting a multilayer structure. Thereby, it is possible to prevent light from reflecting on the interface between the base material and the NIRA coat layer, and prevent occurrence of the rainbow unevenness.

BRIEF DESCRIPTION OF THE DRAWINGS

One with ordinary skill in the art would easily understand the above-described objects and advantages of the present invention when the following detailed description is read with reference to the drawings attached hereto.

DESCRIPTION OF THE PREFERRED EMBODIMENTS

Embodiments of the present invention are described hereinbelow. The present invention, however, is not limited to the following embodiments.

Figure 1:
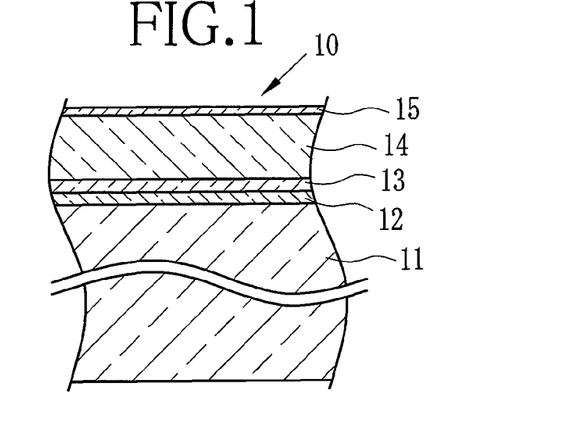
FIG. 1 is a cross sectional view schematically illustrating a multilayer film according to a first embodiment of the present invention.

First of all, the present invention is explained according to a first embodiment. As shown in FIG. 1, an optical multilayer film (hereinafter referred to as multilayer film) 10 of the present invention includes a base material 11 formed of polyester in a film form, a first adhesion layer 12, a second adhesion layer 13, a hard coat layer 14, and an antireflection layer 15 stacked on the base material 11 in this order from a side of the base material 11. The hard coat layer 14 and the antireflection layer 15 are surface layers. The first adhesion layer 12 and the second adhesion layer 13 may be formed on not only one surface of the base material 11 but also both surfaces thereof. Note that the adhesion layer means a layer formed between the base material and the surface layer, and has a function for improving the adhesion extent.

Figure 2:
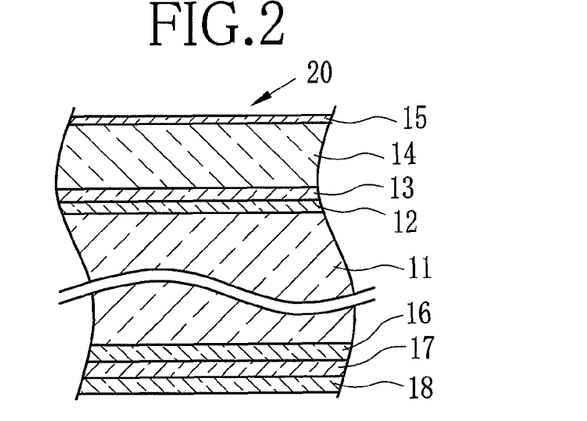
FIG. 2 is a cross sectional view schematically illustrating a multilayer film according to a second embodiment of the present invention.

For example, according to a second embodiment of the present invention, as shown in FIG. 2, when a multilayer film 20 of the present invention includes a first adhesion layer 16, a second adhesion layer 17, and a near infrared ray absorption (NIRA) coat layer 18 additionally formed in this order on another surface of the base material 11 of the multilayer film 10 shown in FIG. 1, it is possible to form the NIRA coat layer 18 at the side of another surface of the base material 11 with strong adhesive force. The multilayer film 20 shown in FIG. 2 can be preferably used as an antireflection film for a plasma display panel (PDP).

Figure 3:
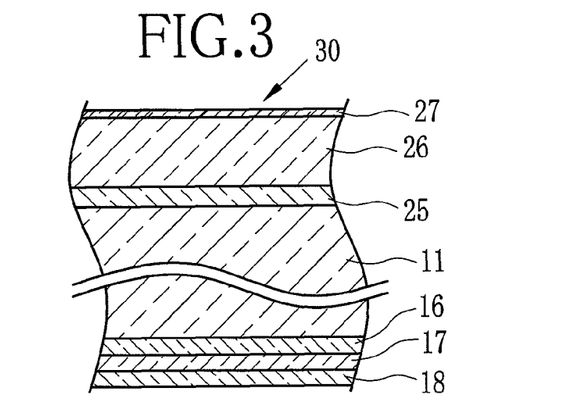
FIG. 3 is a cross sectional view schematically illustrating a multilayer film according to a third embodiment of the present invention.

According to a third embodiment of the present invention, as shown in FIG. 3, a multilayer film 30 of the present invention includes an adhesion layer 25, a hard coat layer 26, and an antireflection layer 27 formed in this order on the base material 11 of the multilayer film 20 at the side opposed to the first adhesion layer 16. The adhesion layer 25 includes the first adhesion layer 12 and the second adhesion layer 13 as one layer. The multilayer film 30 also can be preferably used as an antireflection film for the PDP.

Note that, in FIGS. 1 to 3, the hard coat layer 14 and the NIRA coat layer 18 are considered as surface layers. The surface layer is included not only at a final stage of production of the multilayer film but also at an intermediate stage of production thereof. In a case of the intermediate stage, the antireflection layer 15 or another uppermost layer may be formed on the surface layer of the present invention in some cases.

When a refractive index of the base material 11 is $\eta 1$, a refractive index of the first adhesion layer 12 is $\eta 2$, a refractive index of the second adhesion layer 13 is $\eta 3$, and a refractive index of the hard coat layer 14 as the surface layer is $\eta 4$, the following formulae are satisfied: $\eta 1 < \eta 4$ and $\eta 2 < \eta 3$. Accordingly, reflection of light can be prevented on an interface between the hard coat layer 14 and the base material 11, and it is possible to prevent occurrence of rainbow unevenness due to the interference of light. According to the present invention, the refractive indices of adjacent layers are adjusted so as to satisfy the above condition, and thereby it is possible to obtain the multilayer film 10 having the multilayer structure and capable of preventing occurrence of rainbow unevenness due to the interference of light on each of the interfaces. Further, it is possible to adjust the refractive indices $\eta 1$ to $\eta 4$ of the layers 11 to 14 by adding fine particles to a component of each of the layers 11 to 14 or by arbitrarily deciding the refractive index of polymer to be used as a binder. At this time, the kind of the fine particles is decided and the containing amount of the fine particles is regulated in an arbitrary manner. The method of measuring refractive indices may be any well-known method and not especially limited. Note that the refractive indices $\eta 1$ to $\eta 4$ of the layers 11 to 14 of the present invention are values caused by visible light having a wavelength in a range of 550 nm to 600 nm.

Moreover, $\eta 2/\eta 3$ preferably satisfies the following formula: $(\eta 1/\eta 4)^{1/2} \times 0.95 \leq \eta 2/\eta 3 \leq (\eta 1/\eta 4)^{1/2} \times 1.05$, more preferably $(\eta 1/\eta 4)^{1/2} \times 0.97 \leq \eta 2/\eta 3 \leq (\eta 1/\eta 4)^{1/2} \times 1.03$, and most preferably $(\eta 1/\eta 4)^{1/2} \times 0.98 \leq \eta 2/\eta 3 \leq (\eta 1/\eta 4)^{1/2} \times 1.02$. Accordingly, reflection of light can be prevented on the interface between the base material 11 and the hard coat layer 14 in the multilayer film, and it is possible to prevent occurrence of rainbow unevenness due to the interference of light in the multilayer film.

When $\lambda$ as the wavelength of visible light is in a range of 550 nm to 600 nm, it is preferable that d1(nm) as a thickness of the first adhesion layer 12 and $\eta 2$ as the reflective index thereof satisfy the following formula: $-30 \leq d1-\{\lambda/(4 \times \eta 2)\} \leq 30$ and d2 (nm) as a thickness of the second adhesion layer 13 and $\eta 3$ as the reflective index thereof satisfy the following formula: $-30 \leq d2-\{\lambda/(4 \times \eta 3)\} \leq 30$. It is more preferable that d1 and $\eta 2$ satisfy the following formula: $-20 \leq d1-\{\lambda/(4 \times \eta 2)\} \leq 20$ and d2 and $\eta 3$ satisfy the following formula: $-20 \leq d2-\{\lambda/(4 \times \eta 3)\} \leq 20$. It is most preferable that d1 and $\eta 2$ satisfy the following formula: $-10 \leq d1-\{\lambda/(4 \times \eta 2)\} \leq 10$ and d2 and $\eta 3$ satisfy the following formula: $-10 \leq d2-\{\lambda/(4 \times \eta 3)\} \leq 10$. The multilayer film having the first adhesion layer 12 and the second adhesion layer 13 with the thickness and refractive index adjusted respectively as described above further prevents reflection of light on the interface, thus suppressing the occurrence of the rainbow unevenness as interference of light drastically.

The following formulae (1) to (3) show relation among $\eta 1$, $\eta 2$, $\eta 3$, and $\eta 4$.

$$(\eta 1/\eta 4)^{1/2} \times 0.95 \leq \eta 2/\eta 3 \leq (\eta 1/\eta 4)^{1/2} \times 1.05 \tag{1}$$

$$\eta 1 < \eta 4 \tag{2}$$

$$\eta 2 < \eta 3 \tag{3}$$

The following formulae (4) shows relation between the thickness and the refractive index of the first adhesion layer 12, and the following formulae (5) shows relation between the thickness and the refractive index of the second adhesion layer 13.

$$-30 \leq d1 - \lambda/\{(4 \times \eta 2)\} \leq 30 \tag{4}$$

$$-30 \leq d2 - \lambda/\{(4 \times \eta 3)\} \leq 30 \tag{5}$$

It is considered that reflection of light on the interface between the base material 11 and the hard coat layer 14 can be generally prevented when the following formulae are satisfied: $\eta 2/\eta 3 = (\eta 1/\eta 4)^{1/2}$, $\eta 2 \times d1 = \lambda/4$, and $\eta 3 \times d2 = \lambda/4$. Each of the formulae is described in a general book of optical field such as "Optical Thin Film (Kougaku Hakumaku)" (p. 98, edited by Shiro Fujiwara, published by KYORITSU SHUPPAN CO., LTD, 1986). Accordingly, when the values are adjusted so as to satisfy the above formulae, the degree of reflection of light on the interface becomes zero in theory. Note that it is insufficient to change the kinds of materials or add the fine particles for the purpose of making the reflection of light on the layer approach its theoretical value. Further, when the multilayer film 10 having the multilayer structure shown in FIG. 1 is produced, the factors of the multilayer film 10 become complex, and therefore it becomes further difficult to make the reflection of light on the layer approach its theoretical value. However, it is confirmed that, even when slight deviation of values occurs in the above formulae, it is possible in actual to prevent reflection of light on the interface and occurrence of rainbow unevenness. Therefore, according to the present invention, the formulae (1), (4), and (5) applicable to the multilayer film having the multilayer structure are defined by taking the allowable range of the formulae into consideration, and a more appropriate value is defined. Further, as recent trend, the refractive index of the hard coat layer is increased in order to decrease the degree of reflection of light on the antireflection film. Therefore, when the refractive index of the hard coat layer is set so as to satisfy $\eta 1 < \eta 4$ as seen in Formula (2), it is possible to decrease the degree of reflection of light. Moreover, when the refractive index of the hard coat layer is set so as to satisfy $\eta 2 < \eta 3$ as seen in Formula (3), it is possible to decrease rainbow unevenness.

[Base Material]

Polyester used as the base material 11 is not especially limited, and well-known ones can be used. Concretely, there are polyethylene terephthalate, polyethylene naphthalate, polybutylene terephthalate, polybutylene naphthalate, and the like, for example. Among them, in view of manufacturing cost, mechanical strength, or the like, polyethylene terephthalate is preferably used.

The base material 11 of the present invention is preferably biaxially stretched. The biaxially stretching means that each of the width direction and the longitudinal direction of the base material 11 is considered as one axis, and the base material 11 is stretched in both directions. The biaxially molecular orientation of the base material 11 biaxially stretched as described above is sufficiently controlled, and therefore the base material 11 has excellent mechanical strength. Although the draw ratio thereof is not especially limited, the draw ratio thereof in one direction is preferably 1.5 to 7 times, and more preferably 2 to 5 times. In particular, molecular orientation of the base material 11 biaxially stretched with the draw ratio in one direction of 2 to 5 times is controlled more efficiently, and therefore the base material 11 has very excellent mechanical strength to be suitable. When the draw ratio of the base material 11 is 1.5 times or more, it is possible to obtain efficient mechanical strength in comparison with a case in which the draw ratio is less than 1.5 times. On the contrary, when the draw ratio thereof is 7 times or less, it is possible to obtain uniform thickness in comparison with a case in which the draw ratio exceeds 7 times.

The thickness of the base material 11 is preferably in a range of 30 μm to 400 μm, and more preferably in a range of 35 μm to 350 μm. The thickness of the base material 11 can be adjusted readily by controlling the draw ratio thereof. The base material 11 as described above has transparency and various optical properties, and is light and easy to handle. The base material 11 having the thickness of 30 μm or more is not too thin, and easy to handle. Moreover, the base material 11 having the thickness of 400 μm or less is considered as having an adequate thickness, and makes it easy to perform downsizing and lighting of the image display device and causes no increase in manufacturing cost. The base material 11 of the present invention may contain ultraviolet (UV) absorber and oxidation inhibitor. In particular, for use in the antireflection film for the PDP, UV absorber as disclosed in Japanese Patent Laid-Open Publication No. 2006-212815 is preferably contained in the base material 11.

[First Adhesion Layer and Second Adhesion Layer]

Each of the first adhesion layer 12 and second adhesion layer 13 includes a layer containing at least one of polyester, polyurethane, and acrylic resin. Alternatively, each of the first adhesion layer 12 and second adhesion layer 13 may include fine particles containing at least one of tin oxide, indium oxide, zirconium oxide, and titanium oxide as its main component as needed for the purpose of adjusting the reflective index. Here, the main component means a component whose percentage is 50% or more in the fine particles. The first adhesion layer 12 is formed on the base material 11. Further, the second adhesion layer 13 is formed on the first adhesion layer 12 as described above to function as the antireflection layer.

Polyester is a collective term of polymers having ester bond in its main chain. Generally, polyester is obtained by a reaction between polycarboxylic acid and polyol. Polycarboxylic acid is, for example, fumaric acid, itaconic acid, adipic acid, sebacic acid, terephthalic acid, isophthalic acid, naphthalene dicarboxylic acid, or the like. Among them, terephthalic acid and naphthalene dicarboxylic acid are preferably used. Sodium sulfoisophthalic acid or the like subjected to copolymerization is preferable since it can be used as polyester having water solubility or water dispersibility.

As polyol, there are, for example, ethylene glycol, propylene glycol, 1,4-butanediol, 1,6-hexanediol, glycerin, hexanetriol, neopentyl glycol, polyethylene glycol, polypropylene glycol, polytetramethylene glycol, ethylene oxide adduct of bisphenol A (NC-1900, produced by Nippon Nyukazai Co., Ltd. or the like), polyester polyol, and the like. As a commercially available product, there are polyester water dispersion such as Finetex ES 650 and ES2200 (product name, produced by Dainippon Ink & Chemicals, Inc.), Vylonal MD1400 and MD1480 (product name, produced by TOYOBO., LTD), polyester water-soluble polymer such as Plus coat Z-221, Z-561, Z-730, and RZ-142 (product name, produced by GOO CHEMICAL CO., LTD), and the like.

Polyurethane is a collective term of polymers having urethane bond in its main chain. Generally, polyurethane is obtained by a reaction between polyisocyanate and polyol. Polyisocyanate is TDI, MDI, NDI, TODI, HDI, IPDI, or the like. Polyol is ethylene glycol, propylene glycol, glycerin, hexanetriol, or the like. Additionally, according to the present invention, as polyisocyanate, there can be used a polymer in which polyisocyanate and polyol react to obtain the polyurethane and further the polyurethane is subjected to chain extension process to increase molecular weight thereof. Polyisocyanate, polyol, and the chain extension process are described, for example, in "Handbook of polyurethane resins" (edited by Keiji IWATA, and published by Nikkan Kogyo Shimmbun Ltd., in 1987). As a commercially available product, there are polyurethane water dispersion such as Superflex 830, 460, 870, 420, and 420NS (product name, produced by Dai-ichi Kogyo Seiyaku Co., Ltd.) and Vondic 1370NS and 1320NS, and Hydran AP-40F (product name, produced by Dainippon Ink & Chemicals, Inc).

Acrylic resin is a polymer including acrylic acid, methacrylic acid, and derivatives thereof as its components. As acrylic resin, there is a polymer in which acrylic acid, methacrylic acid, methyl methacrylate, ethyl acrylate, butyl acrylate, 2-ethylhexyl acrylate, acrylamide, acrylonitrile, hydroxyacrylate, or the like as a main component is copolymerized with a monomer capable of being copolymerized with the main component described above. Note that the monomer is, for example, styrene, divinylbenzene, or the like. As a commercially available product, there are acrylic water dispersion such as Jurymer ET325, ET410, and SEK301 (product name, produced by NihonJunyaku Co., Ltd.), Bon Coat AN117 and AN226 (product name, produced by Dainippon Ink & Chemicals, Inc.), and the like.

As described above, when the fine particles are used for the purpose of adjusting the refractive index or for other purposes, there is a possibility of deterioration of light transmittance of the first adhesion layer 12 and the second adhesion layer 13 due to large foreign substances formed by aggregation of the fine particles. In this case, it is possible to prevent the aggregation of the fine particles by deciding the diameter and the kind of the fine particles preferably. In order to efficiently prevent the aggregation of the fine particles, the average diameter of the fine particles is preferably in a range of 5 nm to 200 nm, more preferably in a range of 10 nm to 100 nm, and most preferably in a range of 15 nm to 70 nm. When the fine particles having average diameter of 200 nm or less are used, there is no possibility in which the transparency of the first and second adhesion layers 12 and 13 visible with eyes and the light transmittance thereof decrease. Moreover, it is possible to obtain the fine particles having average diameter of 5 nm or more at a cost lower than that of the fine particles having average diameter less than 5 nm, thus causing advantageous result in view of the manufacturing cost. Further, since the fine particles having average diameter of 5 nm or more are used, in comparison with fine particles having average diameter less than 5 nm, there is less possibility in which the fine particles aggregate and become large foreign substances to decrease the transparency of the first and second adhesion layers 12 and 13. Note that, according to the present invention, the average diameter of the fine particles is an average diameter of arbitrarily selected 50 fine particles. At this time, the diameter of the fine particles is equal to a diameter of a circle having the same dimension as that of fine particle captured by a scanning electron microscope.

The fine particles used for the first adhesion layer 12 and the second adhesion layer 13 are preferably tin oxide, zirconium oxide, or titanium oxide among the fine particles listed above in view of its availability and relatively low cost.

Tin oxide (IV) having a composition of $SnO_2$ is preferably used. Further, the tin oxide is preferably doped by antimony or the like as a doping agent. Since the tin oxide doped as described above has conductivity, it is possible to prevent decrease in surface resistivity of the multilayer film and prevent impurities such as dust from adhering to the surface of the multilayer film. As the tin oxide doped by antimony, there are, for example, FS-10D, SN-38F, SN-88F, SN-100F, TDL-S, and TDL-1 (all of them are produced by ISHIHARA SANGYO KAISHA, LTD.), and the like. They are preferably used in the present invention. Note that tin oxide using phosphorus as a doping agent can be also preferably used.

Zirconium oxide (IV) having a composition of $ZrO_2$ is preferably used. For example, there are NZS-20A and NZS-30A (both of them are produced by NISSAN CHEMICAL INDUSTRIES, LTD), and the like. Titanium oxide (IV) having a composition of $TiO_2$ is preferably used. There are rutile-type (high-temperature tetragonal) titanium dioxide, anatase-type (low-temperature tetragonal) titanium dioxide, and the like, in accordance with the quartz structure, however the titanium dioxide is not especially limited thereto. Additionally, titanium dioxide with the surface subjected to surface treatment also can be used. As titanium dioxide to be used preferably, there are IT-S, IT-O, and IT-W (all of them are produced by Idemitsu Kosan Co., Ltd.), and TTO-W-5 (produced by ISHIHARA SANGYO KAISHA, LTD.), and the like.

Although the molecular weight of the polymer to be used for the first and second adhesion layers 12 and 13 are not especially limited, for the purpose of achieving excellent handling property and forming a layer with preferable flat surfaces, in general, it is preferable that weight-average molecular weight is in a range of 3000 to 1000000. When weight-average molecular weight of the polymer is 3000 or more, there is less possibility in which the strength of the first adhesion layer 12 and the second adhesion layer 13 becomes insufficient in comparison with the polymer having weight-average molecular weight of less than 3000. Moreover, when weight-average molecular weight of the polymer is 1000000 or less, in comparison with the polymer having weight-average molecular weight of more than 1000000, there causes no difficulty in application due to decrease in flowability, and therefore it is possible to prevent deterioration of the planarity of surface of the first and second adhesion layers 12 and 13.

It is preferable that each of first and second adhesion layers 12 and 13 includes a compound containing a plurality of carbodiimide structures in its molecule. In a case where each of the first and second adhesion layers 12 and 13 includes such a compound, when each of the first and second adhesion layers 12 and 13 contains the fine particles, it is possible to prevent the fine particles from being peeled therefrom. The carbodiimide-type compound is not especially limited as long as it has a plurality of carbodiimide groups. Further, the number of the carbodiimide groups is not also limited. In general, polycarbodiimide is synthesized by condensation of organic diisocyanate. The organic group of organic diisocyanate to be used in the synthesis is not especially limited, and may be one of aromatic group and aliphatic group, or a mixture group thereof. In view of reactivity, the aliphatic group is especially preferable. The material for the synthesis is organic isocyanate, organic diisocyanate, organic triisocyanate, or the like.

The organic isocyanate may be aromatic isocyanate, aliphatic isocyanate, or a mixture thereof. Concretely, there may be used 4,4'-diphenylmethane diisocyanate, 4,4-diphenyl dimethylmethane diisocyanate, 1,4-phenylene diisocyanate, 2,4-tolylenediisocyanate, 2,6-tolylenediisocyanate, hexamethylene diisocyanate, cyclohexane diisocyanate, xylylene diisocyanate, 2,2,4-trimethylhexamethylene diisocyanate, 4,4'-dicyclohexylmethane diisocyanate, 1,3-phenylene diisocyanate, or the like. Organic monoisocyanate may be isophorone isocyanate, phenyl isocyanate, cyclohexyl isocyanate, butyl isocyanate, naphthyl isocyanate, or the like. As carbodiimide-type compound applicable to the present invention, Carbodilite V-02-L2 (product name, produced by Nisshinbo Industries, Inc.) or the like as a commercially available product is available, for example.

The amount of the carbodiimide-type compound of the present invention to be added to the binder is preferably in a range of 1 mass % to 200 mass %, more preferably in a range of 5 mass % to 100 mass %. When the additional amount of the carbodiimide-type compound is 1 mass % or more, in comparison with a case where the additional amount thereof is less than 1 mass %, it is possible to prevent sufficiently the fine particles contained in the first and the second adhesion layers 12 and 13 from being peeled therefrom. Further, when the additional amount of the carbodiimide-type compound is 200 mass % or less, in comparison with a case where the additional amount thereof exceeds 200 mass %, it is possible to prevent deterioration of the planarity of surface of the first and the second adhesion layers 12 and 13.

The first and the second adhesion layers 12 and 13 may include the fine particles functioning as a matting agent for the purpose of improving lubricant properties or the like. Here, lubricant properties mean sliding ability of a film. The matting agent may be organic or inorganic fine particles. For example, as the matting agent, there are polymer fine particles such as polystyrene, polymethylmethacrylate, silicone, and benzoguanamine, and inorganic fine particles such as silica, calcium carbonate, magnesium oxide, and magnesium carbonate. Among them, polystyrene, polymethylmethacrylate, and silica are preferably used in view of improving lubricant properties and achieving low cost.

In order to provide preferable lubricant properties, the average diameter of the fine particles of the matting agent is preferably in a range of 0.01 μm to 12 μm, more preferably in a range of 0.03 μm to 9 μm. When the average diameter of the fine particles of the matting agent is 0.01 μm or more, in comparison with a case where the average diameter thereof is less than 0.01 μm, it is possible to achieve preferable lubricant properties. Further, when the average diameter of the fine particles of the matting agent is 12 μm or less, in comparison with a case where the average diameter thereof is exceeds 12 μm, there is no possibility that the displaying quality of the image display device deteriorates. Moreover, the additional amount of the matting agent is variable in accordance with the average diameter of the fine particles. For the purpose of achieving excellent improving efficiency of lubricant properties and preventing deterioration of displaying quality of the image display device, the additional amount of the matting agent is preferably in a range of 0.1 mg/m² to 30 mg/m², more preferably in a range of 0.5 mg/m² to 20 mg/m². When the additional amount of the matting agent is 0.1 mg/m² or more, it is possible to achieve the improving efficiency of lubricant properties. Further, when the additional amount of the matting agent is 30 mg/m² or less, it is possible to prevent the deterioration of displaying quality of the image display device. Note that the average diameter of the fine particles of the matting agent according to the present invention is measured by the same method as that used for measuring the average diameter of the fine particles described above.

The first adhesion layer 12 and the second adhesion layer 13 may include various additives such as a surfactant. The surfactant is, for example, well-known anionic type, nonionic type, or cationic type. The surfactant applicable to the present invention is described, for example, in "Handbook of Surfactants (Kaimen Kasseizai Binran)" (edited by Ichiro Nishi et al., published by Sangyo-Tosho, 1960). When the surfactant is used, additional amount thereof is preferably in a range of 0.1 mg/m² to 30 mg/m², more preferably in a range of 0.2 mg/m² to 10 mg/m². When the additional amount of the surfactant is 0.1 mg/m² or more, in comparison with a case where the additional amount thereof is less than 0.1 mg/m², it is possible to obtain effect of the surfactant. Accordingly, it is possible to prevent repelling on the first adhesion layer 12 and the second adhesion layer 13. Further, when the additional amount of the surfactant is 30 mg/m² or less, in comparison with a case where the additional amount thereof exceeds 30 mg/m², it is possible to prevent the deterioration of the surface of the first adhesion layer 12 and the second adhesion layer 13.

An antistatic agent may be also used in the first adhesion layer 12 and the second adhesion layer 13 to prevent static charge. The kind of the antistatic agent is not especially limited, and as the antistatic agent, for example, there are electron conductive polymers such as polyaniline and polypyrrole, ion conductive polymers having carboxyl group and sulfonate group in its molecular chain, conductive fine particles, and the like. The conductive fine particles may be common fine particles having tin oxide and indium oxide as its main component described above. For example, the conductive fine particles of tin oxide described in Japanese Patent Laid-Open Publication No. 61-020033 may be preferably used in view of its conductivity and transparency. When the antistatic agent is used, the additional amount thereof is preferably adjusted such that the surface resistivity of the first adhesion layer 12 and the second adhesion layer 13 measured at the temperature of 25° C. and under the RH atmosphere of 30% is in a range of $1 \times 10^5 \Omega$ to $1 \times 10^{13} \Omega$. When the surface resistivity of the first and second adhesion layers 12 and 13 is set to $1 \times 10^5 \Omega$ or more, in comparison with a case where the surface resistivity thereof is less than $1 \times 10^5 \Omega$, it is possible to avoid using a large amount of antistatic agent. Accordingly, it is possible to decrease in the transparency of the first and second adhesion layers 12 and 13. Further, when the surface resistivity of thereof is $1 \times 10^{13} \Omega$ or less, in comparison with a case where the surface resistivity thereof exceeds $1 \times 10^{13} \Omega$, it is possible to achieve the effect of preventing static charge. Therefore, there is no possibility in that impurities such as dust adhere to the surface of the first adhesion layer 12 and the second adhesion layer 13.

Lubricant is preferably used in the first adhesion layer 12 and the second adhesion layer 13 in order to improve its lubricant properties. The lubricant is preferably aliphatic wax, and the preferable additional amount thereof is in a range of 0.1 mg/m² to 30 mg/m², more preferably in a range of 0.5 mg/m² to 10 mg/m². When the additional amount of lubricant is 0.1 mg/m² or more, it is possible to achieve sufficient lubricant properties. Further, when the additional amount of lubricant is 30 mg/m² or less, it is possible to prevent decrease in the adhesive strength between the first adhesion layer 12 and the second adhesion layer 13. Note that the aliphatic wax applicable to the present invention is described in detail in Japanese Patent Laid-Open Publication No. 2004-054161.

The various additives described above for improving surface are added to both the first adhesion layer 12 and the second adhesion layer 13. However, in a case where the second adhesion layer 13 is successively formed after the formation of the first adhesion layer 12, the additive may be added to only the second adhesion layer 13.

The method of forming the first and second adhesion layers 12 and 13 is explained. In this embodiment, the first and second adhesion layers 12 and 13 are successively formed as follows. Coating liquid in which the polymer, the fine particles, the additives, and the solvent are preliminarily mixed together is applied to the surface of the base material 11 (polyethylene terephthalate film biaxially stretched) to form a coating layer, and then the coating layer is dried. The solvent described above, that is, the solvent for the coating liquid may be water, toluene, methyl alcohol, isopropyl alcohol, methyl ethyl ketone, and the mixture thereof. Further, the solvent for the coating water may be water. In this case, water functions as solvent for the coating water. When water is used as solvent for the coating water as described above, it is possible to reduce the manufacturing cost and facilitate the manufacturing process.

Although it is preferable that the coating liquid is applied to the base material 11 biaxially stretched as described above, it is also possible that after the first adhesion layer 12 is formed on the base material 11 stretched in one direction and then the base material 11 is stretched in another direction to perform the biaxially stretching, the second adhesion layer 13 is formed on the base material 11 having the first adhesion layer 12 formed thereon in an off-line manner. Here, one axis is considered as one of the width direction and the longitudinal direction of the base material 11. In biaxially stretching the base material 11, the order of the width direction and the longitudinal direction is not limited.

The method of forming the first adhesion layer 12 and the second adhesion layer 13 is not especially limited as long as a layer having a desired thickness can be obtained. Accordingly, the coating method is not also limited, and may be a well-known method used in forming a thin film. For example, there are a dipping method, a spinner method, a spray method, a roll coater method, a gravure method, a wire bar method, a slot extrusion coater method (single-layer and multilayer), a slide coater method, and the like. The coating of the first and the second adhesion layers 12 and 13 may be performed by not only the subsequent coating in an on-line manner but also an independent coating in the off-line manner. The above methods can be used for the formation of the layers of the present invention including the first and second adhesion layers 12 and 13, the hard coat layer 14, and the antireflection layer 15.

[Hard Coat Layer]

The hard coat layer 14 is preferably formed of energy setting polymer or thermosetting polymer. In particular, the energy setting polymer is preferably used. The energy setting polymer is hardened by being irradiated with active energy ray, and therefore suffers less damage in comparison with the thermosetting polymer using heat as energy in being hardened. Accordingly, the energy setting polymer has an advantage in that a layer having high transparency can be formed.

The energy setting polymer to be used for forming the hard coat layer 14 is explained. The energy setting polymer is preferably a curable polymer having at least two acrylic groups in a molecule. For example, there are: polyol polyacrylates such as ethylene glycol diacrylate, 1,6-hexanediol diacrylate, bisphenol-A diacrylate, trimethylolpropane triacrylate, ditrimethylolpropane tetraacrylate, pentaerythritol triacrylate, pentaerythritol tetraacrylate, dipentaerythritol pentaacrylate, and dipentaerythritol hexaacrylate; polyfunctional urethane acrylate obtained by a reaction between polyisocyanate curable polymer and hydroxyl group-containing acrylate such as hydroxyethyl acrylate; and polyfunctional epoxy acrylate obtained by a reaction between polyepoxy curable polymer and hydroxyl group-containing acrylate (methacrylate) such as hydroxyethyl acrylate. Additionally, polymer having ethylenic unsaturated group in its side chain also can be used.

When the energy setting polymer is used, it is preferable that ionizing radiation such as radiation rays as active energy, gamma (γ) rays, alpha (α) rays, electron rays, ultraviolet rays, or the like are irradiated to the coating layer. Thereby, since the polymer can be hardened efficiently and effectively, it becomes possible to form a coating layer, that is, the hard coat layer 14 having sufficient hardness. Note that, when the hard coat layer 14 is formed, it is preferable that, after the coating liquid for forming the hard coat layer 14 is applied to the second adhesion layer 13 to form the coating layer, ultraviolet rays are irradiated to the coating layer. Thereby, it is possible to obtain the hard coat layer 14 having uniform thickness and no unevenness in the optical properties in a short period of time. Note that if the above coating liquid is one obtained by preliminarily diluting the desired energy setting resin, polymerization initiator, or the like by the solvent, it is possible to form the coating layer having uniform thickness readily, thus causing a preferable result.

According to the present invention, one kind of polymerization initiator may be used, or two or more kind of polymerization initiators may be combined to be used. The number of the polymerization initiators is not especially limited. Further, although the additional amount of the polymerization initiator is not also especially limited, the additional amount thereof is preferably in a range of 0.1 mass % to 15 mass % of the total amount of curable polymer containing ethylenically unsaturated group and curable polymer containing ring-opening polymerizable group both included in the curable polymer composition, more preferably in a range of 1 mass % to 10 mass %.

It is preferable that inorganic fine particles are added to a binder to be used for the formation of the hard coat layer 14 and the refractive index thereof is in a range of 1.75 to 2.00. In general, since the refractive index of the inorganic fine particles is as high as 1.8 to 2.7, it is possible to adjust the refractive index of the layer to be formed at a high level within a range described above. When the refractive index of the hard coat layer 14 is 1.75 or more, in comparison with a case where the refractive index thereof is less than 1.75, the degree of reflection of light thereon can be smaller easily. Further, when the refractive index thereof is 2.00 or less, in comparison with a case where the refractive index thereof exceeds 2.00, there is no possibility in that the hard coat layer 14 becomes fragile, and thus making it possible to prevent deterioration of the resistance to flaw.

As the example of composition capable of forming the hard coat layer 14 having high refractive index, there is one in which polyfunctional acrylic acid ester-based monomer used as a polymer component contains the inorganic fine particles such as alumina and titanium oxide. The example is disclosed in Japanese Patent No. 1815116. In addition to this, photopolymerizable compound composition containing the inorganic fine particles having alumina is described in Japanese Patent No. 1416240. These descriptions are also applicable to the present invention. However, the hard coat layer 14 of the present invention is not limited to the above examples.

Moreover, the hard coat layer 14 having high refractive index also can be formed by using a polymer having high refractive index. The polymer having high refractive index may be a polymer containing a cyclic group, a polymer containing halogen atom other than fluorine, a polymer containing both cyclic group and halogen atom other than fluorine, or the like, for example. Note that the cyclic group includes an aromatic group, a heterocyclic group, an alicyclic group, and the like.

Although the thickness of the hard coat layer 14 is not especially limited, the thickness thereof is preferably in a range of 0.5 μm to 10 μm, more preferably in a range of 1 μm to 5 μm. Thereby, it is possible to achieve desirable optical properties and physical properties such as excellent resistance to flaw, and further keep high adhesive strength on the interface between the second adhesion layer 13 and the hard coat layer 14. When the thickness of the hard coat layer 14 is 0.5 μm or more, it is possible to provide sufficient physical properties and excellent resistance to flaw. Further, when the thickness thereof is 10 μm or less, it is possible to reduce the influence of the hardening and absorption of the hard coat layer 14 and keep high adhesive strength on the interface between the second adhesion layer 13 and the hard coat layer 14.

[Antireflection Layer]

In order to provide an antireflection function, the refractive index of the antireflection layer 15 is lower than that of the hard coat layer 14. The adjustment is performed by using a material having a low refractive index such as fluorinated material and silicone material as the binder in order to form a layer having a low refractive index. The refractive index of the antireflection layer 15 is preferably 1.50 or less. In this case, in comparison with a case where the refractive index thereof exceeds 1.50, the antireflection properties can be enhanced. In forming the antireflection layer 15, a coating material commercially available for forming an antireflection film can be used. As such a coating material for forming a layer having a low refractive index, there are commercially available coating materials having a low refractive index such as TT1148, TU2111, and TU2153 (all of them are produced by JSR Corporation).

The multilayer film obtained as described above has high adhesive strength between the layers and prevents the interference of light on the interfaces between the layers, thus decreasing occurrence of rainbow unevenness. The multilayer film having excellent optical properties as described above can be used as the antireflection film having excellent displaying quality in the various image display devices.

The multilayer film of the present invention can be used as an optical film for use in a liquid crystal display, a plasma display (PDP), an organic EL display, a surface-conduction electron-emitter display (SED), and a CRT display. These image display devices are described in detail, for example, in "Display Advanced Technology (Display Sentan Gijyutsu)" (edited by Chizuka Tani, published by Kyoritsu Publication Inc, 1998). "EL, PDP, and LCD Displays (issued by TORAY RESEARCH CENTER, INC., 2001), "Color Liquid Crystal Display (Color Ekisyo Display)" edited by Shunsuke Kobayashi, published by Sangyo Tosho Publishing Co., Ltd., 1990), and the like.

The multilayer film of the present invention can be preferably used as the optical film such as the antireflection film, an IR absorption film, an electromagnetic wave shielding film, and a toned film, each for use in PDP, and a film filter obtained by integrating them together. Note that these films are described in "Electric Journal", p. 74, August, 2002, for example, in addition to the above documents.

Next, each layer in the optical multilayer film 20 having the NIRA coat layer 18 is described. The first adhesion layer 12, the second adhesion layer 13, the hard coat layer 14, and the antireflection layer 15 are the same as those in the multilayer film 10 having the hard coat layer 14 described above. Therefore, the detailed explanation thereof will be omitted. The materials of the first adhesion layer 16 for forming the NIRA coat layer 18 are the same as those of the first adhesion layer 12 in the multilayer film 10.

The materials of the second adhesion layer 17 for forming the NIRA coat layer 18 are the same as those of the second adhesion layer 13 in the multilayer film 10.

The NIRA coat layer 18 includes near infrared ray shielding agent and organic binder. The near infrared ray shielding agent may be a well-known one, and is not especially limited. As the near infrared ray shielding agent, there are metal oxide such as indium tin oxide, indium oxide, tin oxide, silicon oxide, aluminum oxide, zinc oxide, and tungsten oxide; organic coloring matter such as phthalocyanine type, anthraquinone type, naphthoquinone type, cyanine type, naphthalocyanine type, condensed polymeric azo type, and pyrrole type; organometallic complex such as dithiol type and mercaptonaphthol type; and the like, for example. One kind of near infrared ray shielding agent may be used solely, or two or more kinds of near infrared ray shielding agents may be combined together to be used.

Additionally, as commercially available near infrared ray shielding agents, there are IRG-02, IRG-022, IRG-023, and IRG-040 (all of them are produced by NIPPON KAYAKU CO., LTD), IR1, IR2, IR3, IR4, TX-EX-810K, TX-EX-812K, and TX-EX-905B (all of them are produced by NIPPON SHOKUBAI CO., LTD), SIR-128, SIR-130, SIR-132, and SIR-159 (all of them are produced by Mitsui Chemicals, Inc.), CIR-1080 and CIR 1081 (both of them are produced by Japan Carlit Co., Ltd), NKX-1199 (produced by Nippon Kankoshikiso Research Laboratory), MIR101 (produced by Midori Kagaku Co., Ltd), and the like.

When the layer containing the near infrared ray shielding agent is formed on the base material, the organic binder in which the near infrared ray shielding agent is dissolved or dispersed may be used to form the layer. As the organic binder, there are polyolefin (polyethylene, polypropylene, and the like) and polystyrene compound such as polystyrene and poly($\alpha$-methylstyrene); styrene copolymer such as styrene-butadiene copolymer, styrene-isoprene copolymer, styrene-maleic acid copolymer, and styrene-maleic acid ester copolymer; polyvinyl compound such as polyvinyl chloride, polyvinyl alcohol, and polyvinyl acetate; Polyalkyl methacrylate such as Polymethyl methacrylate, Polyethyl methacrylate, Polypropyl methacrylate, and Polybutylpropyl methacrylate; polyether such as polyoxymethylene and polyethylene oxide; polyester such as polyethylene succinate, polybutylene adipate, polylactate, polyglycolic acid, polycaprolactone, and polyethylene terephthalate; natural polymer such as cellulose, starch, and rubber; polyamide such as 6-nylon and 6,6-nylon; polyurethane, epoxy resin, polyacrylate, rosin, modified rosin, terpene resin, phenol resin, aliphatic or alicyclic hydrocarbon, aromatic petroleum, and modified halogen of them, for example. One kind of organic binder may be used, and two or more kinds of organic binders may be combined to be used. Further, curable monomer may be applied to form a layer, and then the curable monomer is hardened by being irradiated with active energy ray such as heat and ultraviolet ray.

Hereinafter, the present invention is explained in detail by referring to Examples and Comparative Examples. Note that Examples and Comparative Examples hereinbelow are considered as a representative of the present invention, and the present invention is not limited thereto. Accordingly, the kinds of materials, the rate of the materials, treatments, and the like may be arbitrarily changed within the spirit of the present invention. Further, hereinafter, the manufacturing method and the conditions thereof are explained in detail in Example 1, and the same ones as those of Example 1 will be omitted in other Examples and Comparative Examples.

Example 1

In this example, in accordance with the following procedure, the multilayer film shown in FIG. 1 was formed.

[Base Material]

Polyethylene terephthalate (hereinafter referred to as PET) having inherent viscosity of 0.66 was synthesized by polycondensation reaction. The catalyst used in the reaction was antimony trioxide. The PET was dried until the water content thereof became 50 ppm or less, and thereafter melted in an extruder having a heater set at the temperature of 280 to 300° C. Next, the melted PET was discharged onto a chill roll to which electrostatic charge was applied from a die section, thus obtaining an amorphous film. Subsequently, the amorphous film was stretched by 2.9 times in the longitudinal direction of the film, and further stretched by 4.0 times in the width direction thereof, thus completing the biaxially stretching and producing the base material 11 having the thickness of 150 μm. Note that the refractive index η1 of the base material 11 thus obtained was 1.65.

[Adhesion Layer]

While the roll-shaped base material 11 having a width of 2 m and a length of 2000 m was transferred at the feeding speed of 70 m/min, the surfaces thereof were subjected to corona discharge treatment under the condition of 730 J/m². Thereafter, a coating liquid A was applied to both surfaces of the base material 11 by a bar coating method, and the coating liquid A was dried at the temperature of 180° C. for one minute to form the first adhesion layer 12. Then, the first adhesion layer 12 was subjected to corona discharge treatment under the condition of 730 J/m². Thereafter, a coating liquid B was applied to the upper surfaces of the first adhesion layer 12 by a bar coating method, and the coating liquid B was dried at the temperature of 165° C. for one minute to form the second adhesion layer 13. Note that the application amount of the coating liquid A and B was 4.4 ml/m² on each of the surfaces.

[Coating Liquid A]

Each of the materials whose application amount of solid content is as follows is mixed together to prepare the coating liquid A.

| | |
|---|---|
| Polyester | 70.0 (mg/m²) |
| Carbodiimide compound | 14.0 (mg/m²) |
| Surfactant A | 0.5 (mg/m²) |
| Surfactant B | 1.0 (mg/m²) |
| Tin oxide dispersion liquid (Dispersion liquid in which tin oxide fine particle are dispersed in water) | 14.0 (mg/m²) |

[Coating Liquid B]

Each of the materials whose application amount of solid content is as follows is mixed together to prepare the coating liquid B.

| | |
|---|---|
| Polyester | 45.0 (mg/m$^2$) |
| Carbodiimide compound | 9.0 (mg/m$^2$) |
| Surfactant A | 0.5 (mg/m$^2$) |
| Surfactant B | 1.0 (mg/m$^2$) |
| Tin oxide dispersion liquid | 143.0 (mg/m$^2$) |
| Silica dispersion liquid (Dispersion liquid in which silica fine particle are dispersed in water) | 1.2 (mg/m$^2$) |
| Carnauba wax | 3.0 (mg/m$^2$) |

The thickness of each of the first adhesion layer 12 and the second adhesion layer 13 after being dried was measured with use of a transmission electron microscope (JEM2010, produced by JEOL Ltd.) at the magnification of 200000 times. As a result, the thickness d1 of the first adhesion layer 12 was 88 nm, and the thickness d2 of the second adhesion layer 13 was 86 nm. Further, the refractive index of each of the first adhesion layer 12 and the second adhesion layer 13 measured by a method described below was 1.567 and 1.650, respectively.

[Measurement of Thickness of Adhesion Layer]

Thickness of adhesion layer was measured as follows. At first, a film to which the first and second adhesion layers 12 and 13 were applied was embedded with epoxy and dried. Thereafter, the film embedded with epoxy is cut until the thickness thereof became 100 nm by a microtome, thus obtaining a sample piece, for the purpose of using the cross section of the sample piece to measure the thickness of the adhesion layer. The image of the sample piece was captured by the transmission electron microscope described above at the magnification of 200000 times. The thickness of each of 10 points at the interval of 20 nm on the captured image was measured, and average value of the measured thicknesses except the maximum value and the minimum value was obtained.

[Measurement of Refractive Index of Adhesion Layer]

The refractive indices of the sample provided with the coating layer at the wavelength of 660 nm and 850 nm were measured with use of a refractive index measuring device (SPA-4000, produced by Sairon Technology, Inc.) by a prism coupler method. Next, based on the measurement value of the refractive index at each wavelength and the following Celmaire formula, the refractive index $\eta 2$ of the first adhesion layer 12 and the refractive index $\eta 3$ of the second adhesion layer 13 at the wavelength of 550 nm were calculated. Note that Celmaire formula is denoted by: $\eta^2 - 1 = A\lambda^2/(\lambda^2 - B)$. Here, $\lambda$ is a measured wavelength (nm), $\eta$ is a refractive index at the measured wavelength, and A and B are constants. After the constants A and B were calculated by assigning the measured wavelength and the refractive index to the above formula, the wavelength of 550 nm was assigned thereto, thus obtaining the refractive index $\eta 2$ of the first adhesion layer 12 and the refractive index $\eta 3$ of the second adhesion layer 13 at the wavelength of 550 nm. The sample described above was produced by applying the coating liquid to a commercially available silicon wafer such that the thickness thereof after being dried became a value in a range of 3 μm to 4 μm to form the coating layer, and then drying the resultant at the temperature of 105° C. for 10 minutes.

[Hard Coat Layer]

Cyclohexanone dispersion liquid having 30 mass % of Titan oxide TTO-55B (produced by ISHIHARA SANGYO KAISHA, LTD.) was prepared. Methyl ethyl ketone (MEK) was added to 177 parts by mass of TTO-55B dispersion liquid, 20 parts by mass of dipentaerythritol hexaacrylate (DPHA, produced by NIPPON KAYAKU CO., LTD), and 2 parts by mass of Irgacure 184 (produced by Chiba Speciality Chemicals Inc.) to prepare a coating liquid for hard coat layer (hereinafter referred to as hard coat layer coating liquid) with solid content of parts by mass of 8%. The hard coat layer coating liquid was applied to one surface of the adhesion layer thus formed such that the thickness thereof became approximately 35 μm to form a coating layer. Thereafter, the coating layer was dried at the temperature of 80° C. for 1 minute. Next, ultra violet rays were irradiated to the dried coating layer with use of a high pressure mercury lamp to harden the resin, thus forming the hard coat layer 14 with the thickness of 3 μm. Note that the amount of the ultra violet rays irradiated to the coating layer was set to 1000 mJ/cm$^2$. Furthermore, the refractive index $\eta 4$ of the hard coat layer 14 was measured by the same method in measuring the refractive index of the first layer 12. The measurement value was 1.83.

[Antireflection Layer]

TU2111 (produced by JSR Corporation) is applied to the hard coat layer 14 to be dried. Then, ultra violet rays were irradiated thereto. Note that the amount of the ultra violet rays irradiated to the coating layer was set to 1000 mJ/cm$^2$. Thereby, a layer having a low refractive index with the thickness of 0.1 μm was formed. Note that the refractive index of the layer was 1.39. Since the refractive index of the hard coat layer 14 was as high as 1.83, the layer having a low refractive index functions as the antireflection layer 15.

Example 2

As shown in Table 1, experiment was performed in the same manner as Example 1 except that the coating liquid A in Example 1 was substituted by a coating liquid C and the coating liquid B in Example 1 was substituted by a coating liquid D in Example 2.

[Coating Liquid C]

Each of the materials whose application amount of solid content is as follows is mixed together to prepare the coating liquid C.

| | |
|---|---|
| Polyurethane | 52.0 (mg/m$^2$) |
| Carbodiimide compound | 10.4 (mg/m$^2$) |
| Surfactant A | 0.5 (mg/m$^2$) |
| Surfactant B | 1.0 (mg/m$^2$) |
| Tin oxide dispersion liquid | 110.0 (mg/m$^2$) |

[Coating Liquid D]

Each of the materials whose application amount of solid content is as follows is mixed together to prepare the coating liquid D.

| | |
|---|---|
| Polyurethane | 47.0 (mg/m$^2$) |
| Carbodiimide compound | 9.4 (mg/m$^2$) |
| Surfactant A | 0.5 (mg/m$^2$) |
| Surfactant B | 1.0 (mg/m$^2$) |
| Titanium oxide dispersion liquid (Dispersion liquid in which titanium oxide fine particle are dispersed in water) | 66.0 (mg/m$^2$) |
| Silica dispersion liquid | 1.2 (mg/m$^2$) |
| Carnauba wax | 3.0 (mg/m$^2$) |

Example 3

As shown in Table 1, experiment was performed in the same manner as Example 1 except that the coating liquid A in Example 1 was substituted by a coating liquid E and the coating liquid B in Example 1 was substituted by a coating liquid F in Example 3.

[Coating Liquid E]

Each of the materials whose application amount of solid content is as follows is mixed together to prepare the coating liquid E.

| | |
|---|---|
| Acrylic resin | 73.0 (mg/m$^2$) |
| Carbodiimide compound | 14.6 (mg/m$^2$) |
| Surfactant A | 0.5 (mg/m$^2$) |
| Surfactant B | 1.0 (mg/m$^2$) |
| Tin oxide dispersion liquid | 14.0 (mg/m$^2$) |

[Coating Liquid F]

Each of the materials whose application amount of solid content is as follows is mixed together to prepare the coating liquid F.

| | |
|---|---|
| Polyester | 58.0 (mg/m$^2$) |
| Carbodiimide compound | 11.6 (mg/m$^2$) |
| Surfactant A | 0.5 (mg/m$^2$) |
| Surfactant B | 1.0 (mg/m$^2$) |
| Tin oxide dispersion liquid | 56.0 (mg/m$^2$) |
| Silica dispersion liquid | 1.2 (mg/m$^2$) |
| Carnauba wax | 3.0 (mg/m$^2$) |

Comparative Example 1

As shown in Table 1, experiment was performed in the same manner as Example 1 except that the coating liquid C in Example 2 was substituted by the coating liquid D and the coating liquid D in Example 2 was substituted by the coating liquid C in Comparative Example 1.

Comparative Example 2

As shown in Table 1, experiment was performed in the same manner as Example 1 except that the coating liquid E in Example 3 was substituted by the coating liquid F and the coating liquid F in Example 3 was substituted by the coating liquid E in Comparative Example 2.

Comparative Example 3

As shown in Table 1, experiment was performed in the same manner as Example 1 except that the coating liquid A in Example 1 was substituted by a coating liquid G and a second adhesion layer was not formed in this example.

[Coating Liquid G]

Each of the materials whose application amount of solid content is as follows is mixed together to prepare the coating liquid G.

| | |
|---|---|
| Polyurethane | 43.2 (mg/m$^2$) |
| Carbodiimide compound | 8.6 (mg/m$^2$) |
| Surfactant A | 0.5 (mg/m$^2$) |
| Surfactant B | 0.9 (mg/m$^2$) |
| Titanium oxide dispersion liquid | 79.0 (mg/m$^2$) |
| Silica dispersion liquid | 1.1 (mg/m$^2$) |
| Carnauba wax | 3.0 (mg/m$^2$) |

The materials for preparing the coating liquids A to G were as follows.

Polyester: Z 561, produced by GOO CHEMICAL CO., LTD, with solid content of 25%

Carbodiimide compound: Carbodiright V-02-L2 (water solution with solid content of 10% and carbodiimide equivalence of 385) produced by Nisshinbo Industries, Inc.

Surfactant A: Rapisol B-90 (water solution with solid content of 1% and anionic) produced by CHUKYO YUSHI CO., LTD.

Surfactant B: Naloacty HN-100 (water solution with solid content of 5% and nonionic) produced by Sanyo Chemical Industries, Ltd.

Tin oxide dispersion liquid: SN-38F (water solution with solid content of 17%, an average diameter of fine particles of antimony doped tin oxide of 30 nm) produced by ISHIHARA SANGYO KAISHA, LTD.

Silica dispersion liquid: OX-50 (water solution with solid content of 10%) produced by NIPPON AEROSIL CO., LTD.

Carnauba wax: Cellosol 524 (water solution with solid content of 3%) produced by CHUKYO YUSHI CO., LTD.

Polyurethane: UD-350, produced by Mitsui Chemicals, Inc., with solid content of 38%

Titanium oxide dispersion liquid: TTO-W-5 (water solution with solid content of 30%, an average diameter of fine particles of titanium oxide of 70 nm) produced by ISHIHARA SANGYO KAISHA, LTD.

Acrylic resin: ET-410, produced by NihonJunyaku Co., Ltd., with solid content of 30%

The multilayer films formed in Examples 1 to 3 and Comparative Examples 1 to 3 were evaluated as to the following 5 items such as the adhesion, the optical properties, and the like. Evaluation 1 shows adhesion extent between the base material 11 and the first adhesion layer 12. Evaluation 2 shows adhesion extent between the second adhesion layer 13 and the hard coat layer 14. Evaluation 3 shows a state of application surface of the multilayer film. Evaluation 4 shows whether rainbow unevenness occurred or not on the multilayer film. Evaluation 5 shows resistance to flaw. The details of the respective evaluation methods are shown hereinbelow.

[1. Adhesion Extent Between Base Material and First Adhesion Layer]

First of all, the coating liquid used for forming the first adhesion layer 12 in each of Examples and Comparative examples was applied to the surface of the base material 11, and a sample thus obtained was kept soaked in distilled water at the temperature of 60° C. for 16 hours. Next, the sample after being soaked was taken from the distilled water, and a drop of water adhered to the surface of the sample was wiped lightly by a piece of paper (product name: kimwipe S-200, produced by NIPPON PAPER CRECIA CO., LTD.). Thereafter, immediately, the surface of the sample was scratched by a diamond stylus of 0.1 R with use of a scratch resistance strength tester (product name: HEIDON-18, produced by Shinto Scientific Co., Ltd.). The scratched area was observed with a microscope of 100 times power, and then the condition of the peeled first adhesion layer 12 was checked with eyes and judged based on a standard mentioned below. Thereby, the adhesive strength between the base material 11 and the first adhesion layer 12, that is, the adhesion extent thereof was evaluated by five stages. Further, a load applied to the diamond stylus was set to 200 g. Note that in the below evaluation, if the product is evaluated as rank A or B, the level thereof is sufficient.

Rank A: No peeling.
Rank B: The peeled area is less than 30% of the whole area scratched by the diamond stylus.
Rank C: The peeled area is not less than 30% and less than 70% of the whole area scratched by the diamond stylus.
Rank D: The peeled area is not less than 70% and not more than 100% of the whole area scratched by the diamond stylus.
Rank E: In addition to the area scratched by the diamond stylus, the coating layer near the scratched area is also peeled.

[2. Adhesion Extent Between Second Adhesion Layer and Hard Coat Layer]

The humidity of the multilayer film including the hard coat layer 14 was kept at the temperature of 25° C. under the atmosphere of 60% RH for 24 hours to obtain a sample. Next, 25 lattices were formed on the surface of the sample to be evaluated by making 6 scratches in the longitudinal and width directions thereof respectively with use of a single-edged razor blade. Thereafter, cellophane tape (No. 405, width of 24 mm, and produced by Nichiban Co., Ltd.) was adhered thereto. The cellophane tape was completely adhered to the surface of the scratched sample by rubbing the cellophane tape with an eraser, and then the cellophane tape was peeled off in a direction of 90 degrees with respect to the horizontal plane. Thereby, the number of lattices peeled off was obtained to evaluate the adhesive strength between second adhesion layer 13 and the hard coat layer 14, that is, adhesion extent thereof by five stages. In a case where the lattices were partially peeled off, the partially peeled areas were added together to be converted into the number of lattices. In the below evaluation, if the product is evaluated as rank A or B, the level thereof is sufficient. Note that, the width of each scratch was 3 mm in the longitudinal and width directions.
Rank A: No peeling.
Rank B: The number of lattices peeled off was less than 1.
Rank C: The number of lattices peeled off was not less than 1 and less than 3.
Rank D: The number of lattices peeled off was not less than 3 and less than 20.
Rank E: The number of lattices peeled off was 20 or more.

[3. State of Application Surface of Multilayer Film]

First of all, the first and second adhesion layers 12 and 13 were formed on the surface of the base material 11 to obtain a sample. Next, the sample was put on a disk onto which black doeskin cloth was adhered, and fluorescent diffused light having passed through a creamy white acrylic sheet was irradiated to the coating layer. Then, light reflected thereon was observed with eyes to judge the application unevenness based on a standard mentioned below, thus evaluating the application surface by three stages. Note that, in the below evaluation, if the product is evaluated as rank A or B, the level thereof is sufficient.
Rank A: Application unevenness was not observed with eyes on the sample subjected to blackening treatment and the sample not subjected to blackening treatment.
Rank B: Although application unevenness was observed with eyes on the sample subjected to blackening treatment, application unevenness was not observed on the sample not subjected to blackening treatment.
Rank C: Application unevenness was observed with eyes on the sample subjected to blackening treatment and the sample not subjected to blackening treatment.

Note that on Evaluation 3, in judging with eyes, a predetermined area of the surface of the sample was subjected to blackening treatment in order to prevent reflection of light on the rear surface thereof, and the light transmittance at the wave length of 550 nm was adjusted so as to be 1% or less. In the blackening treatment described above, magic marker (product name: art line, refilling ink for oil based ink, KR-20 black, produced by Shachihata Inc.) was applied to a surface of the sample opposed to the surface to be observed. Thereafter, the surface was dried.

[4. Whether Rainbow Unevenness Occurred or not on Multilayer Film]

First of all, the humidity of the multilayer film thus obtained (including the first and second adhesion layers 12 and 13, the hard coat layer 14, and the antireflection layer 15) was adjusted at the temperature of 25° C. under the atmosphere of 60% RH for 24 hours to obtain a sample. Next, a surface of the sample not having the coating layer 14 was rubbed with sand paper adequately, and then the black magic marker for use in Evaluation 3 was applied thereto in order to prevent reflection of light on the rear surface thereof. Thereafter, the sample was put on a disk and illuminated with a three-wavelength fluorescent lamp (product name: National PALOOK fluorescent lamp FL20SS•EX-D/18) from above with keeping a distance of 30 cm to cause interference fringe (rainbow unevenness), and the interference fringe was observed with eyes. The observed interference fringe was considered as rainbow unevenness and evaluated based on the below standard by five stages. Note that, in the below evaluation, if the product is evaluated as rank A, B, or C, the level thereof is sufficient.
Rank A: No rainbow unevenness was observed.
Rank B: Almost no rainbow unevenness was observed.
Rank C: Rainbow unevenness was slightly observed.
Rank D: Rainbow unevenness was strong.
Rank E: Rainbow unevenness was very strong.

[5. Resistance to Flaw]

First of all, an adhesion layer was formed on the surface of the base material 11 to obtain a multilayer film. A continuous load application-type scratch resistance strength tester (product name: TYPE-HEIDON-18, produced by Shinto Scientific Co., Ltd., detection stylus of sapphire stylus of 0.1 R, scratching speed of 600 mm/min, and used weight of 200 g) was used to obtain load at the time when the flaw occurred on the multilayer film.
Rank A (Excellent resistance to flaw): Load at the time when the flaw occurred $\geq 30$ g
Rank B (No problem in practical use): 30 g>Load at the time when the flaw occurred $\geq 20$ g
Rank C (Considered as problem): 20 g>Load at the time when the flaw occurred $\geq 20$ g
Rank D (Considered as problem): 10 g >Load at the time when the flaw occurred

TABLE 1

|  |  | Ex 1 | Ex 2 | Ex 3 | Com 1 | Com 2 | Com 3 | Ex 11 | Ex 12 | Com 11 |
|---|---|---|---|---|---|---|---|---|---|---|
| SL | Kind of layer | HC | HC | HC | HC | HC | HC | NIRA | NIRA | NIRA |
|  | η4 | 1.83 | 1.83 | 1.83 | 1.83 | 1.83 | 1.83 | 1.51 | 1.51 | 1.51 |

TABLE 1-continued

|  |  | Ex 1 | Ex 2 | Ex 3 | Com 1 | Com 2 | Com 3 | Ex 11 | Ex 12 | Com 11 |
|---|---|---|---|---|---|---|---|---|---|---|
| SAAL | CL | B | D | F | C | E | None | L | L | None |
|  | d2 (nm) | 86 | 81 | 85 | 85 | 92 |  | 89 | 89 |  |
|  | η3 | 1.65 | 1.70 | 1.59 | 1.61 | 1.51 |  | 1.55 | 1.55 |  |
| FAAL | CL | A | C | E | D | F | G | K | K | E |
|  | d1 (nm) | 88 | 85 | 92 | 81 | 85 | 79 | 85 | 85 | 92 |
|  | η2 | 1.57 | 1.61 | 1.51 | 1.70 | 1.59 | 1.74 | 1.62 | 1.62 | 1.51 |
| BM | η1 | 1.65 | 1.65 | 1.65 | 1.65 | 1.65 | 1.65 | 1.65 | 1.65 | 1.65 |
|  | η2/η3 | 0.95 | 0.95 | 0.95 | 1.06 | 1.05 |  | 1.05 | 1.05 |  |
| $(\eta1 \times \eta4)^{1/2} \times 0.95$ |  | 0.90 | 0.90 | 0.90 | 0.90 | 0.90 |  | 0.99 | 0.99 |  |
| $(\eta1 \times \eta4)^{1/2} \times 1.05$ |  | 1.00 | 1.00 | 1.00 | 1.00 | 1.00 |  | 1.10 | 1.10 |  |
|  | Eva 1 | A | A | A | A | A | A |  |  |  |
|  | Eva 2 | A | A | A | A | A | C |  |  |  |
|  | Eva 3 | A | A | A-B | D | D | A | A | A | D |
|  | Eva 4 | A | A-B | A | A | A | D |  |  |  |

The results in Examples and Comparative Examples were collectively shown in Table 1. In Table 1, "Ex" denotes Example, "Com" denotes Comparative Example, "Eva" denotes Evaluation, "d1" denotes the thickness of the first adhesion layer, "d2" denotes the thickness of the second adhesion layer, "η1" denotes a refractive index of the base material, "η2" denotes a refractive index of the first adhesion layer, "η3" denotes a refractive index of the second adhesion layer, and "η4" denotes a refractive index of the surface layer. Further, "CL" means the coating liquid. "SL" means the surface layer, "SAAL" means the second adhesion layer, "FAAL" means the first adhesion layer. "BM" means the base material. Evaluations 1 and 2 relate to the adhesion extent, Evaluation 4 relates the rainbow unevenness, and Evaluation 5 relates to the resistance to flaw.

As shown in Table 1, respective Examples exhibited excellent result as a product to be used in all evaluations. On the other hand, in Comparative Examples 1 and 2, rainbow unevenness causing a problem as a product was observed. Additionally, in Comparative Example 3 having one adhesion layer, the rank in the evaluation of rainbow unevenness was A as excellent result. The refractive index of the adhesion layer was 1.74. In order to achieve such a high refractive index, it is necessary to set the content of the metal oxide particles contained in the adhesion layer to high. As a result, the rank in the evaluation of resistance to flaw was D, thus resulting in a problem in practical use. Moreover, since the content of the metal oxide particles was high, the strength of the adhesion layer decreased, and thereby the adhesive strength with hard coat layer also decreased. Accordingly, the rank in Evaluation 2 was C.

Next, the present invention is explained in detail by referring to Examples and Comparative Examples according to second and third embodiments of the present invention.

Example 11

In this example, in accordance with the following procedure, the multilayer film 20 shown in FIG. 2 was formed. At first, the multilayer film 10 similar to that in Example 1 was formed. The first adhesion layer 16, the second adhesion layer 17, and the NIRA coat layer 18 were formed on the surface of the base material 11 of the multilayer film 10. Accordingly, the multilayer film 20 including the hard coat layer 14 and the antireflection layer 15 on one surface of the base material 11 and the NIRA coat layer 18 on the other surface thereof was obtained.

The first and second adhesion layers 16 and 17 and the NIRA coat layer 18 were formed on the base material 11 of the multilayer film 10 as follows. First of all, as in the case of Example 1, the roll-shaped multilayer film 10 having a width of 2 m and a length of 2000 m was formed. While the multilayer film 10 was transferred at the feeding speed of 70 m/min, the surface thereof was subjected to corona discharge treatment under the condition of 730 J/m². Thereafter, a coating liquid K was applied to the surface of the base material 11 of the multilayer film 10 by a bar coating method, and then the coating liquid K was dried at the temperature of 180° C. for one minute to form the first adhesion layer 16. Subsequently, the surface of the first adhesion layer 16 was subjected to corona discharge treatment under the condition of 730 J/m². Thereafter, a coating liquid L was applied to the surface of the first adhesion layer 16 by a bar coating method, and the coating liquid L was dried at the temperature of 165° C. for one minute to form the second adhesion layer 17. Note that the application amount of the coating liquid K and L was 4.4 ml/m² on each of the surfaces.

[Coating Liquid K]

Each of the materials whose application amount of solid content is as follows is mixed together to prepare the coating liquid K.

| Polyester | 55.0 (mg/m²) |
|---|---|
| Carbodiimide compound | 11.0 (mg/m²) |
| Surfactant A | 0.5 (mg/m²) |
| Surfactant B | 1.0 (mg/m²) |
| Tin oxide dispersion liquid | 91.0 (mg/m²) |

[Coating Liquid L]

Each of the materials whose application amount of solid content is as follows respectively is mixed together to prepare the coating liquid L.

| Acrylic resin | 60.0 (mg/m²) |
|---|---|
| Carbodiimide compound | 12.0 (mg/m²) |
| Surfactant A | 0.5 (mg/m²) |
| Surfactant B | 1.0 (mg/m²) |
| Tin oxide dispersion liquid | 65.0 (mg/m²) |
| Silica dispersion liquid | 1.1 (mg/m²) |
| Carnauba wax | 3.0 (mg/m²) |

[NIRA Coat Layer]

A near infrared ray absorbing coloring matter in which 3.1 parts by mass of IRG-022, 0.5 parts by mass of IR1, and 1.7 parts by mass of SIR-159 were dissolved into 100 parts by mass of Methyl ethyl ketone (MEK), and 880 parts by weight of commercially available UV curable polymer (product name: Z7503, produced by JSR Corporation) as the binder were mixed and stirred together, to form a coating liquid for the NIRA coat layer (hereinafter referred to as NIRA coat layer coating liquid). First, the NIRA coat layer coating liquid was applied to the second adhesion layer 17 such that the thickness thereof became approximately 20 μm, and then dried at the temperature of 70° C. for 2 minutes. Thereafter, ultra violet rays were irradiated thereto so as to harden the NIRA coat layer coating liquid. Note that the amount of the ultra violet rays irradiated thereto was set to 500 mJ/cm$^2$. Thereby, the NIRA coat multilayer film 20 having a thickness of 9 μm after being dried was formed.

The humidity of the NIRA coat multilayer film 20 thus formed was kept at the temperature of 25° C. under the atmosphere of 60% RH for 24 hours to obtain a sample. Next, the surface of the NIRA coat layer as the sample was rubbed with sand paper adequately, and then the black magic marker for use in Evaluation 3 was applied thereto in order to prevent reflection of light on the surface of the NIRA coat layer. Thereafter, the sample was put on a disk such that the antireflection film side thereof was exposed outside, and illuminated with a three-wavelength fluorescent lamp (product name: National PALOOK fluorescent lamp FL20SS·EX-D/18) from above with keeping a distance of 30 cm to cause interference fringe (rainbow unevenness), and the interference fringe was observed with eyes. The observed interference fringe was considered as rainbow unevenness and evaluated based on the above-described standard by five stages. The evaluated result was rank A, and therefore considered as a level sufficient to prevent the rainbow unevenness.

Example 12

In Example 12, experiment was performed in the same manner as Example 11 except that the first adhesion layer and the second adhesion layer at the side of hard coat layer in Example 11 were substituted by a single-layered adhesion layer. The adhesion layer was prepared with use of the coating liquid G as in the case of Comparative Example 3.

Comparative Example 11

In Comparative Example 11, experiment was performed in the same manner as Example 11 except that the first adhesion layer and the second adhesion layer at the side of NIRA coat layer in Example 11 were substituted by only the first adhesion layer. The first adhesion layer was prepared with use of the coating liquid E as in the case of Example 3.

As shown in Table 1, in Examples 11 and 12, the evaluated rank as to rainbow unevenness was rank A, and therefore considered as a level sufficient to prevent the rainbow unevenness. On the contrary, in Comparative Example 11, the evaluated rank as to rainbow unevenness was rank D, and therefore considered as a poor level.

The antireflection film thus formed was set on an area of commercially available PDP (product name: W37P—HR9000, produced by Hitachi, Ltd.) from which an optical filter was removed. Then, it was confirmed that the antireflection film prevented the occurrence of rainbow unevenness and had very excellent optical properties such as antireflection performance. Similarly, the antireflection film provided with the NIRA coat layer was set on the above-described PDP, and it was confirmed that the antireflection film provided with the NIRA coat layer prevented the occurrence of rainbow unevenness and had very excellent optical properties as the multilayer film for shielding near infrared rays.

The present invention is not to be limited to the above embodiments, and on the contrary, various modifications will be possible without departing from the scope and spirit of the present invention as specified in claims appended hereto.

What is claimed is:

1. An optical multilayer film comprising:
   a base material formed of polyester having a refractive index of $\eta1$;
   a first adhesion layer having a refractive index of $\eta2$ on said base material;
   a second adhesion layer having a refractive index of $\eta3$ on said first adhesion layer; and
   a surface layer having a refractive index of $\eta4$ on said second adhesion layer,
   wherein said $\eta1$, $\eta2$, $\eta3$ and $\eta4$ satisfy a formula (1), $$(\eta1/\eta4)^{1/2} \times 0.95 \leq \eta2/\eta3 \leq (\eta1/\eta4)^{1/2} \times 1.05 \tag{1}$$

and wherein d1 (nm) as a thickness of said first adhesion layer and said $\eta2$ satisfy a formula (4), and d2 (nm) as a thickness of said second adhesion layer and said $\eta3$ satisfy a formula (5), at a wavelength λ of visible light in a range of 550 nm to 600 nm, $$-30 \leq d1 - \{\lambda/(4 \times \eta2)\} \leq 30 \tag{4}$$

$$-30 \leq d2 - \{\lambda/(4 \times \eta3)\} \leq 30 \tag{5}$$

2. An optical multilayer film as defined in claim 1, wherein said surface layer is a hard coat layer, and said refractive indices $\eta1$, $\eta2$, $\eta3$, and $\eta4$ of said base material, first adhesion layer, second adhesion layer, and surface layer satisfy formulae (2) and (3), $$\eta1 < \eta4 \tag{2}$$

$$\eta2 < \eta3 \tag{3}$$

3. An optical multilayer film as defined in claim 2, wherein said first adhesion layer and said second adhesion layer include at least one of polyester, polyurethane, and acrylic resin.

4. An optical multilayer film as defined in claim 3, wherein said second adhesion layer includes fine particles containing one of tin oxide, indium oxide, zirconium oxide, and titanium oxide as its main component.

5. An optical multilayer film as defined in claim 4, wherein at least one of said first adhesion layer and said second adhesion layer includes a compound containing a plurality of carbodiimide structures in its molecule.

6. An optical multilayer film as defined in claim 1, wherein said polyester is polyethylene terephthalate and $\eta4$ as the refractive index of said hard coat layer is in a range of 1.75 to 2.0.

7. An optical multilayer film as defined in claim 6, wherein an antireflection layer is formed on said hard coat layer and said antireflection layer has a refractive index of 1.50 or less.

8. An optical multilayer film as defined in claim 1, wherein said surface layer is a near infrared ray absorption (NIRA) coat layer, and said first adhesion layer and said second adhesion layer include at least one of polyester, polyurethane, and acrylic resin.

9. An optical multilayer film as defined in claim 1 further comprising a third adhesion layer formed on said base material at a side opposite to said first adhesion layer, and said hard coat layer formed on said third adhesion layer.

10. An image display device comprising an optical multilayer film defined in any one of claims 1-5, 6-8, and 9.

* * * * *